Figure 1:
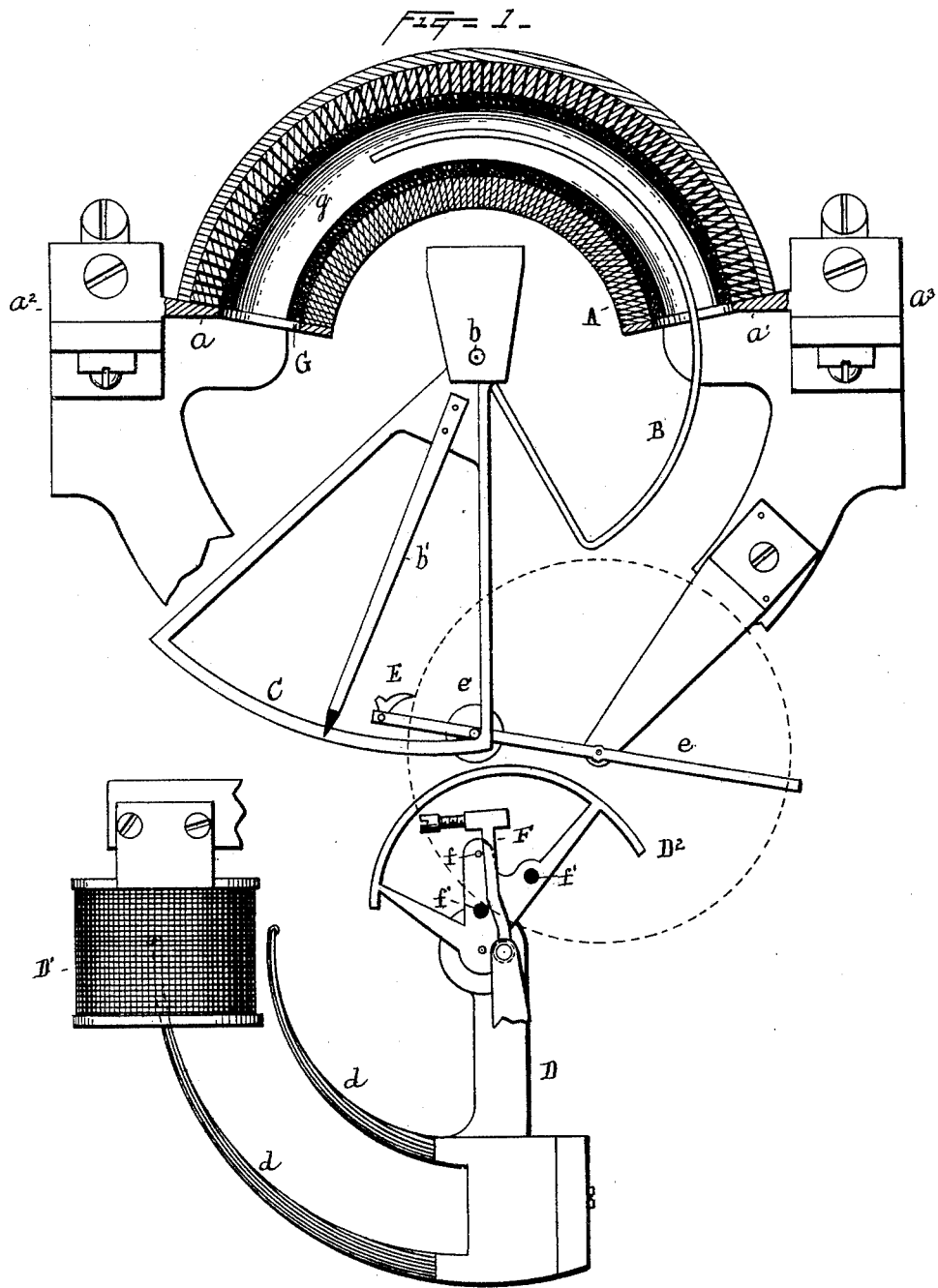

(No Model.) 3 Sheets—Sheet 1.
W. D. MARKS.
ELECTRICAL METER.

No. 586,559. Patented July 20, 1897.

Witnesses
Norris A. Clark.

Inventor
William D. Marks
By his Attorneys
Dyer & Driscoll

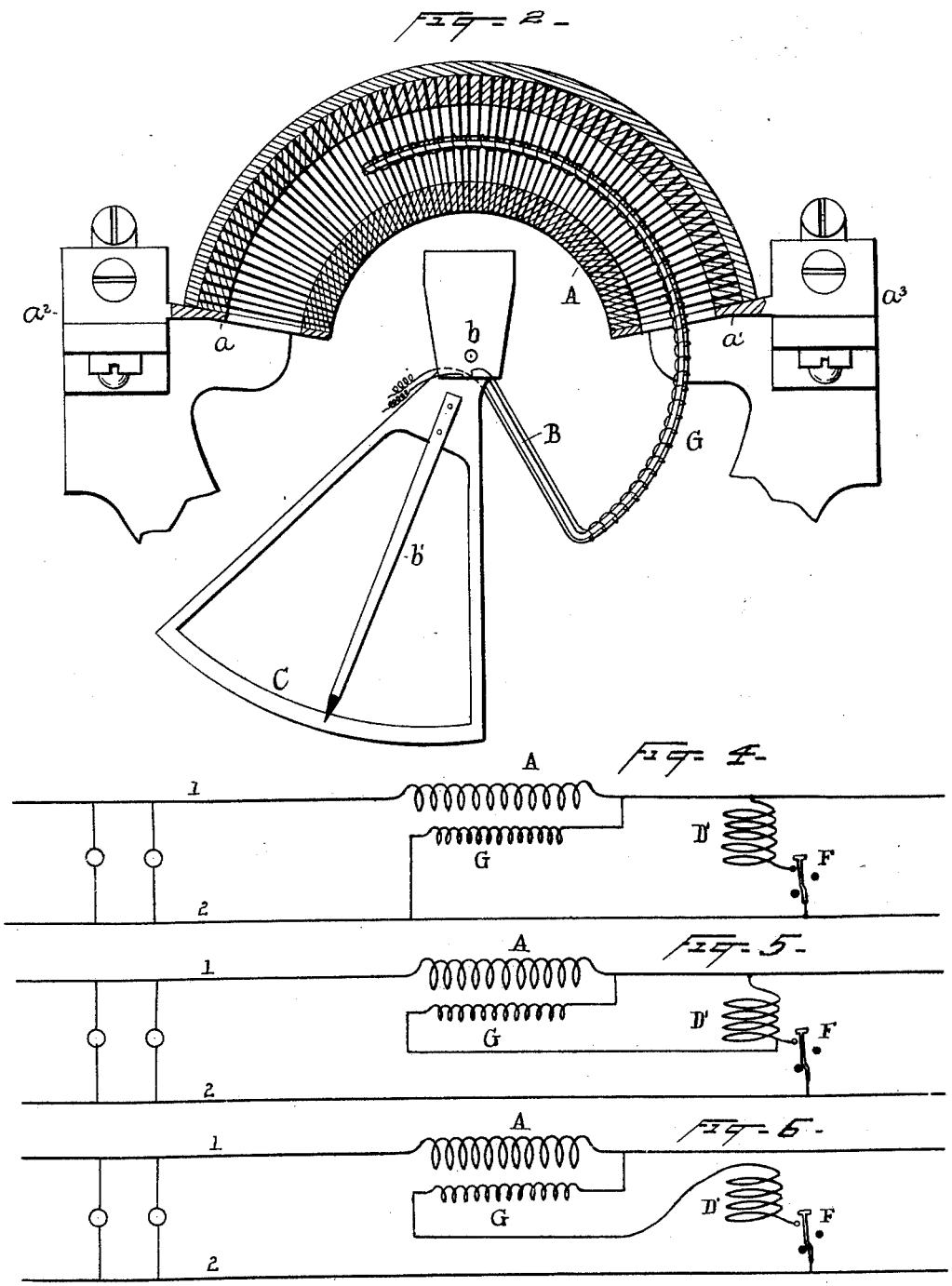

(No Model.) 3 Sheets—Sheet 3.
W. D. MARKS.
ELECTRICAL METER.
No. 586,559. Patented July 20, 1897.
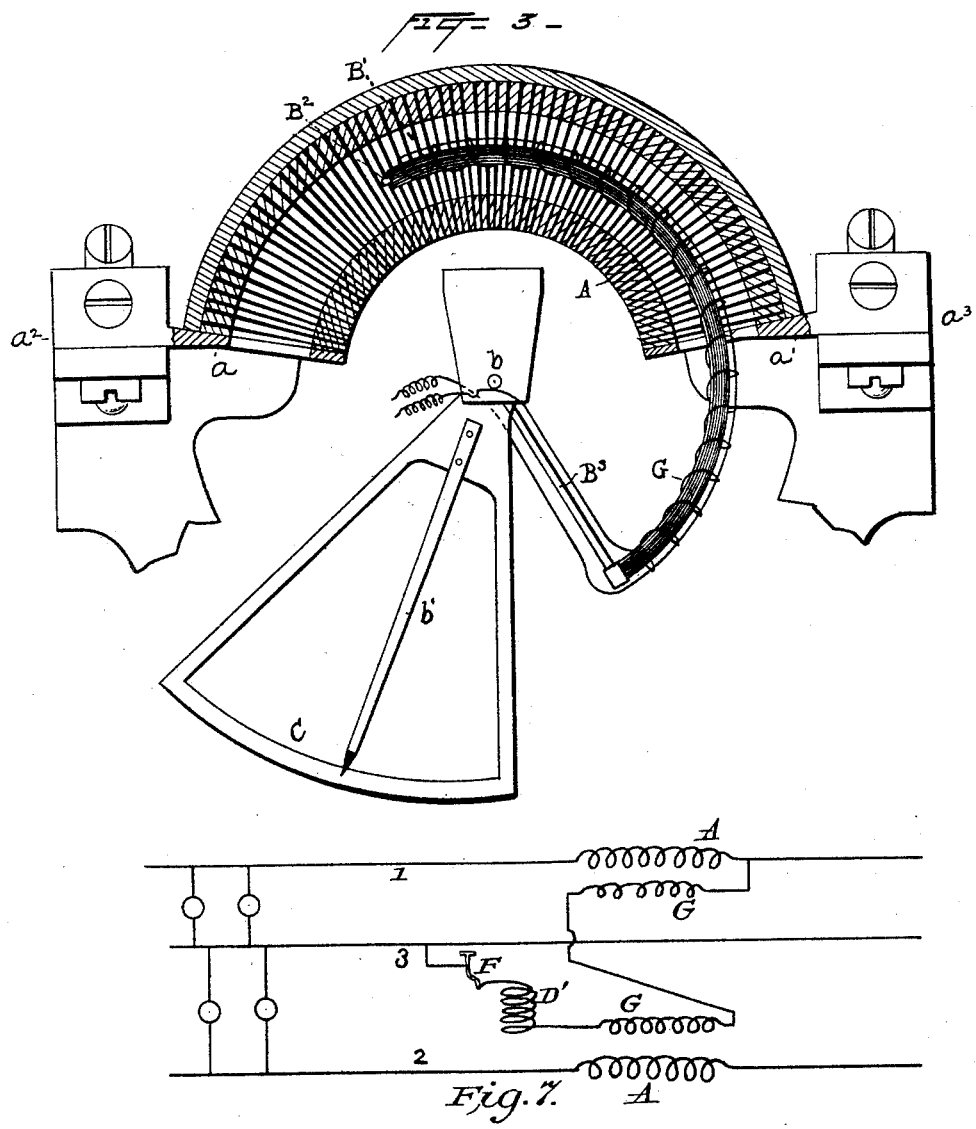

UNITED STATES PATENT OFFICE.

WILLIAM D. MARKS, OF PHILADELPHIA, PENNSYLVANIA, ASSIGNOR TO
THE AMERICAN ELECTRIC METER COMPANY, OF SAME PLACE.

ELECTRICAL METER.

SPECIFICATION forming part of Letters Patent No. 586,559, dated July 20, 1897.

Application filed January 23, 1897. Serial No. 620,312. (No model.)

*To all whom it may concern:*

Be it known that I, WILLIAM D. MARKS, a citizen of the United States, residing at Philadelphia, in the county of Philadelphia and State of Pennsylvania, have invented a certain new and useful Improvement in Electrical Meters or Indicators, of which the following is a specification.

One object of my invention is to prevent incorrect indication or registration in electrical meters or indicators due to magnetic and frictional lag. In electrical meters and indicators it is the common practice to employ a coil which actuates a movable element made of soft iron and whose movement adjusts the indicator or recording device. I have found by experiment that the purest iron obtainable has more or less magnetic lag and in all instances forming permanent poles when subjected to the action of electric currents. It has so far proved an impossibility to obtain iron which will not do this. I have found that the incorrect indication or registration due to that cause can be eliminated or greatly reduced by producing a polarization of the cores, vanes, rings, needles, or other movable elements which are suspended within or actuated by solenoids or other windings, and in carrying my invention into effect I provide the meter or indicator with an additional winding through which the current may flow in either direction and which will produce a polarization of the movable element. This may be accomplished in the case of a meter or indicator having an actuating-solenoid and an iron core which moves a pointer by providing an additional winding within the solenoid to produce saturation or polarization of the core, or the extra winding may be placed directly upon the core, or both arrangements may be employed. This arrangement I find overcomes the objections due to magnetic lag, but in order to overcome the objections due to frictional lag I have found it necessary to interrupt the circuit of the extra winding, so that the magnetization produced by the extra winding will occur intermittently and cause a slight oscillation of the movable part, thereby disturbing its bearings and causing it to finally settle exactly in the position which it would assume if no mechanical friction existed. I have also found by experiment that the occasional interruption of the current through the extra winding does not interfere with the elimination or reduction of magnetic lag.

I have also found by experiment that in meters or indicators having a single indicator or recorder for indicating the total current flowing in two or more circuits or for three-wire service systems, where the solenoid-coils which actuate the indicator-core are placed in the main outside wires only, when unequal amounts of current are flowing through the solenoid-coils or when one solenoid-coil has no current passing through it and the other has a considerable current passing through it the meter or indicator gives a higher indication than when the same amount of current is equally divided between the solenoid-coils. I find that in registering-meters for three-wire systems controlled by ampere-indicators if the load is all on one side the meter will register slightly too high, depending upon the accidental variation or character of the solenoid-cores.

A further object of my invention is to overcome this defect in the class of meters or indicators just referred to. I have made various experiments in this direction and find that the defect can be eliminated or greatly reduced by employing solenoid-cores made up of a number of strands of iron wire and provided with a magnetizing-coil. In making the stranded cores I preferably employ a core of brass wire, to which strands of chemically pure iron wire are applied, the whole core being about one-eighth of an inch in diameter. For the iron wire I preferably employ about fifty strands of very fine wire, about one one-hundredth of an inch in diameter for the smaller sizes of meters. The peculiarity of this type of core is that it does not readily give up its magnetization, and in this condition it is very sensitive to the influence of the actuating-solenoid at the zero-point, where other types of solid cores are not easily affected by slight variations of current strength.

In the accompanying drawings, which illustrate my invention, Figures 1, 2, and 3 are partial elevations and partial sections of parts of an electric meter embodying my invention, and Figs. 4, 5, 6, and 7 are diagrammatic views illustrating the circuit connections.

In illustrating my invention I have shown it applied to a registering-meter of the type shown and described in Patent No. 571,032, issued November 10, 1896, although it will be readily understood that my invention is equally applicable to ordinary volt or ampere meters or indicators.

Fig. 1 illustrates the essential parts of a registering-meter, the circuit-connections and the framework of the meter being omitted for the sake of clearness. A is the solenoid of the ampere-indicator, carried by two arms $a$ $a'$, forming part of the circuit-terminals $a^2$ $a^3$. B is the core, actuated by the ampere-indicator solenoid. This core is carried by an arbor $b$, which also carries the pointer $b'$ and the inverted arch or cam C, which is adjusted by the ampere-indicator and controls the angle through which the primary wheel of the register is periodically moved by the actuating-motor. The actuating-motor comprises the oscillating pendulum D, carrying solenoid-cores $d$, the actuating-solenoid D', and the cam $D^2$, which communicates the movement of the pendulum to the driving-pawl E of the register. This pawl is carried by a pivoted lever $e$, which is provided with a pin $e'$, adapted to rest on the inside of the arch C, and the number of teeth picked up by the pawl for each oscillation of the motor will vary according to the position of the arch. The circuit of the motor-solenoid D' is periodically opened and closed by the overbalanced circuit-controller F, which plays between two insulated pins $f'$ and makes contact with the metal pin $f$, said pins being carried by the arms of the cam $D^2$. The function and operation of the parts just described need no further description, since the same are well known. The extra winding G for eliminating the inaccuracies due to both magnetic and frictional lag is placed within the solenoid of the ampere-indicator, and this winding is preferably of fine wire coiled upon a tube $g$, of paper, rubber, brass, or other suitable material.

Fig. 2 shows the parts of the ampere-indicator of Fig. 1; but in this illustration the extra winding is placed upon the solenoid-core which moves the pointer and inverted arch. With this arrangement suitable flexible connections or rubbing-contacts may be employed to connect the extra winding with the line-wires.

Fig. 3 is a view similar to Fig. 2, but illustrating the form of solenoid-core preferred for three-wire meters. In a three-wire meter two solenoids A are employed, one for each of the outside wires, and such solenoids are placed side by side, as in the form of meter shown in the patent above referred to. The solenoid-core illustrated in Fig. 3 is made up of strands of fine iron wire B', bunched around a core of brass wire $B^2$. The extra winding G is wound on the core, as in Fig. 2, and, if desired, this winding may be employed to hold the strands of the core together. The core in this arrangement is carried by an arm $B^3$, provided with a socket into which the core is inserted, and which arm projects from the arbor $b$.

In each of the arrangements referred to the circuit of the extra winding is preferably broken periodically by the circuit-controller of the chrono-electric motor which operates the registering mechanism.

I prefer to place the extra winding upon the solenoid-core of the ampere-indicator, as illustrated in Figs. 2 and 3, because that arrangement causes the core to be magnetized throughout its whole length in all positions.

The circuit connections of meters for two-wire systems are illustrated in the diagrams Figs. 4, 5, and 6.

In Fig. 4, A is the solenoid of the ampere-indicator, connected in the conductor 1; D', the motor-winding, connected across the line; F, the circuit-controller for the motor-winding, and G the extra winding, connected across the circuit. By this arrangement the circuit of the extra winding is not interrupted, and a constant magnetization of the core B will be produced, and hence only the magnetic lag will be affected.

In Fig. 5 the extra winding G and the motor-winding are connected in a shunt from the conductor 1, and these two windings are periodically connected across the circuit 1 2 in shunt relation by the oscillating controller F. By this arrangement the magnetization of the core B will be interrupted periodically with the periodic opening and closing of the circuit at the controller F, thus producing a periodic oscillation of the core B to disturb the bearings of its arbor and hence overcoming the effects of frictional lag, as well as the magnetic lag.

In Fig. 6 the extra winding G is connected in series with the motor-winding across the circuit. The effect of this connection is the same as that of Fig. 5.

In Fig. 7, which shows the connections of meters for three-wire systems, the ampere-solenoids A A are placed in the outside conductors 1 2, and the two extra windings G G are connected in series with each other and with the motor-winding D' between the outside conductor 1 and the neutral or compensating conductor 3. If desired, these windings may be connected in series across the outside conductors, or the windings G G may be connected in series across the outside conductors or between one of the outside conductors and the neutral in multiple-arc relation to the motor-winding D', or the three windings G, G, and D' may be separately connected in multiple-arc relation between either of the outside conductors and the neutral or across the outside conductors.

What I claim is—

1. In an electric meter or indicator, the combination with the actuating-coils and the movable member, of means for eliminating or reducing magnetic lag, substantially as set forth.

2. In an electric meter or indicator, the combination with the actuating-coils and the movable member, of an extra winding for eliminating or reducing magnetic lag, substantially as set forth.

3. In an electric meter or indicator, the combination with the actuating-coils and the movable member, of an extra winding for slightly magnetizing the movable member to eliminate or reduce magnetic lag, and means for interrupting the circuit of said winding to intermittently magnetize said movable member, whereby an intermittent movement is imparted thereto to disturb its bearing and overcome frictional lag, substantially as set forth.

4. In an electrical registering-meter, the combination with a register or counter and an actuating-motor, of an ampere-indicator for determining the rate of registration, and means for eliminating or reducing magnetic lag in said indicator, substantially as set forth.

5. In an electrical registering-meter, the combination with a register or counter and an actuating-motor, of an ampere-indicator for determining the rate of registration, and means for eliminating or reducing both magnetic and frictional lag in said indicator, substantially as set forth.

6. In an electrical registering-meter, the combination with a register or counter and an actuating-motor, of an ampere-indicator for determining the rate of registration, and an extra winding for said indicator producing magnetization of the movable part, to eliminate or reduce magnetic lag, substantially as set forth.

7. In an electrical registering-meter, the combination with a register or counter and an actuating-motor, of an ampere-indicator for determining the rate of registration, and an extra winding for said indicator producing magnetization of the movable part to eliminate or reduce magnetic lag, and a circuit-controller operated by the motor for interrupting the circuit of said winding, whereby the movable member is intermittently magnetized by said winding to produce an intermittent movement thereof and overcome frictional lag, substantially as set forth.

8. In an electric meter or indicator, the combination with the actuating-coil, of a movable member or core made of strands of wire and provided with a magnetizing-coil, substantially as set forth.

9. In an electric meter or indicator, the combination with the actuating-coil, of a movable member or core made of strands of fine iron wire and provided with a magnetizing-coil, substantially as set forth.

10. In an electric meter or indicator for recording or indicating the total current flowing through several actuating-solenoids, the combination with the solenoids, of cores actuated by the solenoids, and means for preventing incorrect indication due to unequal load, substantially as set forth.

11. In an electric meter or indicator for recording or indicating the total current flowing through several actuating-solenoids, the combination with the solenoids, of cores actuated by the solenoids, said cores being made of strands of fine wire and provided with magnetizing-coils, whereby incorrect indication due to unequal loading is prevented, substantially as set forth.

This specification signed and witnessed this 18th day of January, 1897.

WM. D. MARKS.

Witnesses:
CHARLES S. WAGONER,
ERNEST L. TUSTIN.